INVENTOR.
EDWARD RUTKOVE
ATTORNEY

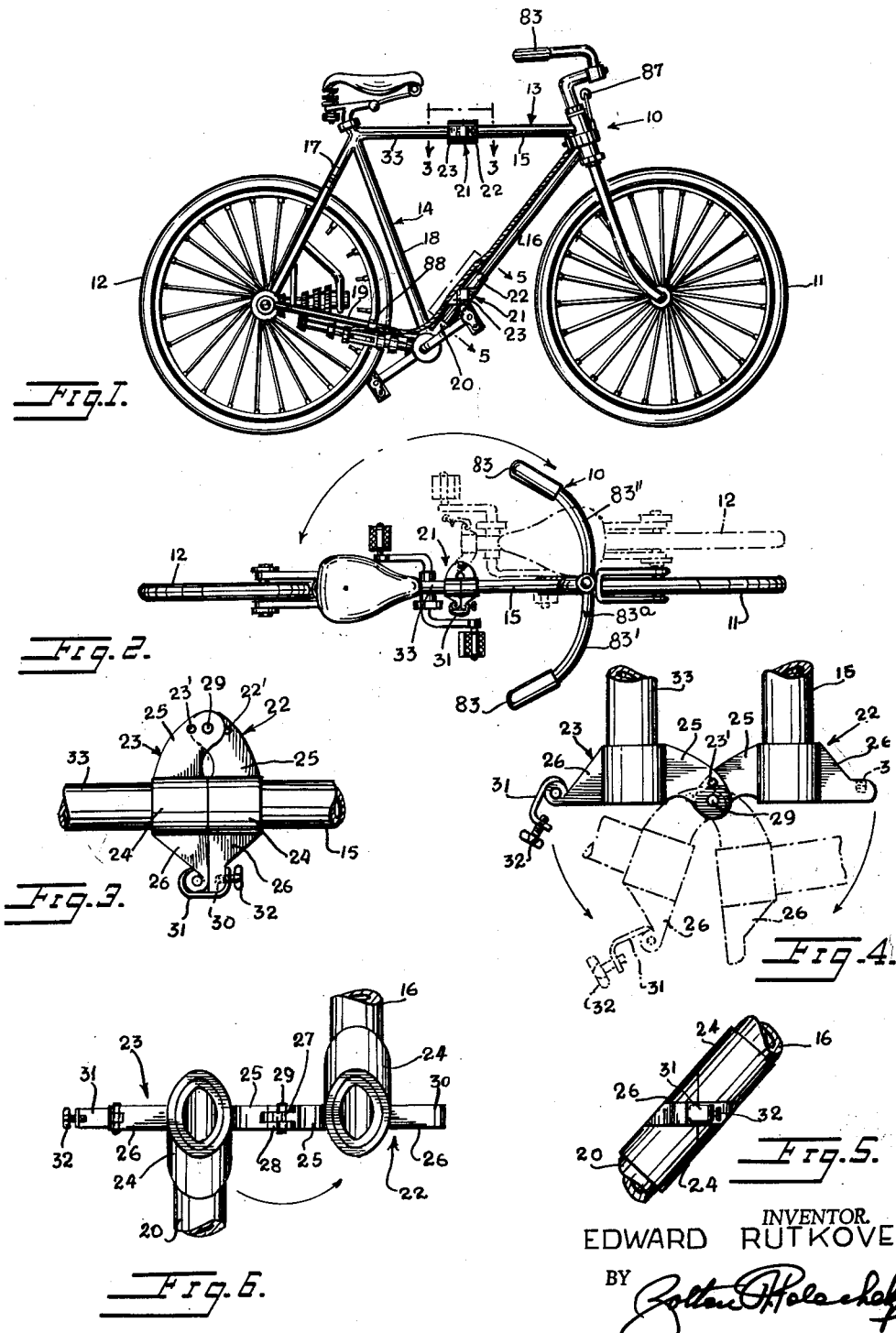

Jan. 22, 1963   E. RUTKOVE   3,074,741
FOLDING BICYCLE
Filed July 25, 1961   3 Sheets-Sheet 3
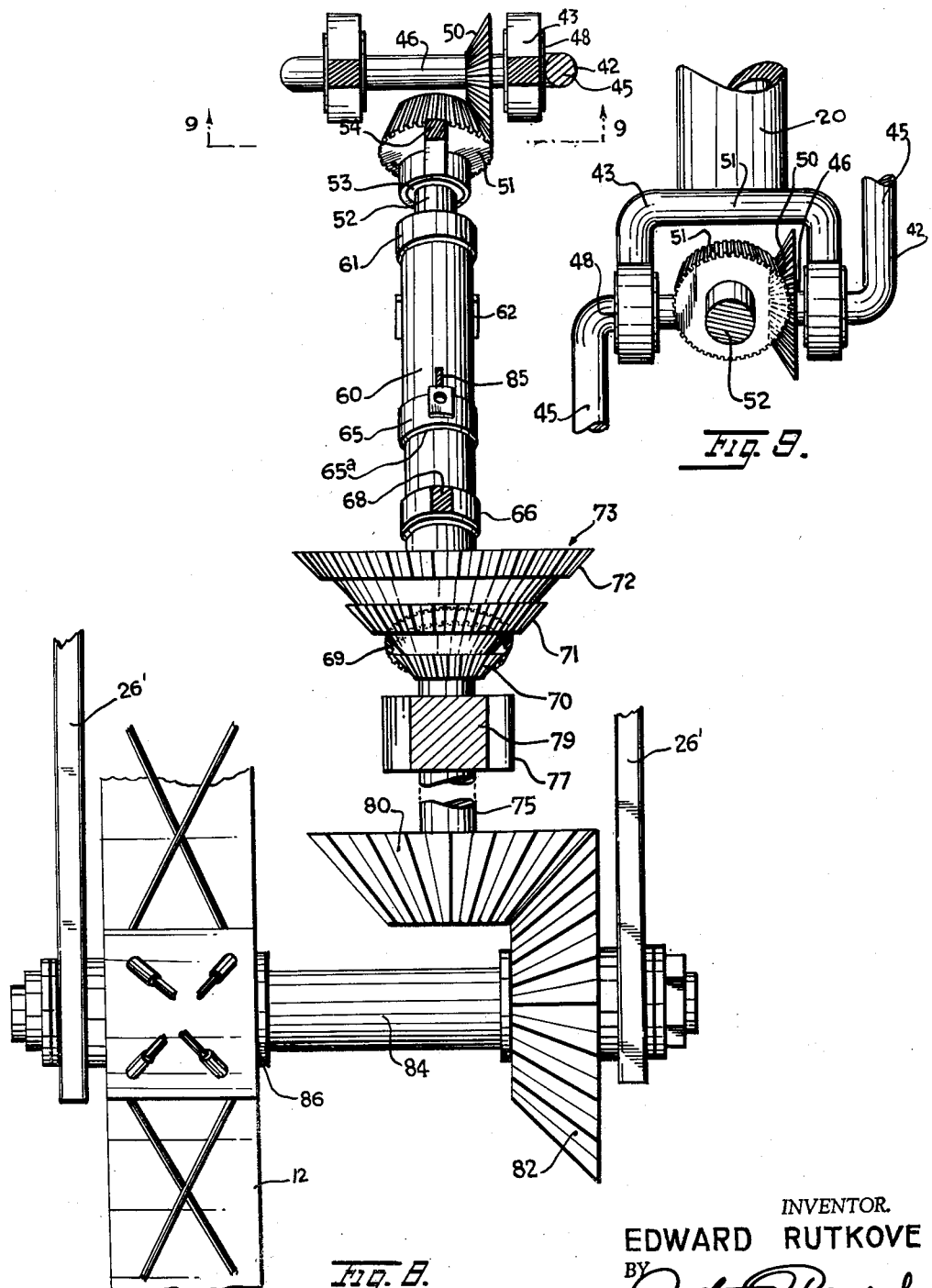
INVENTOR.
EDWARD RUTKOVE
ATTORNEY // 3,074,741
Patented Jan. 22, 1963

3,074,741
FOLDING BICYCLE
Edward Rutkove, 2630 Cropsey Ave., Brooklyn, N.Y.
Filed July 25, 1961, Ser. No. 126,721
1 Claim. (Cl. 280—278)

This invention concerns a folding bicycle with gear shift for changing cycling speed.

A principal object of the invention is to provide a folding bicycle with improved hinge assemblies.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a bicycle embodying the invention, parts being shown broken away.

FIG. 2 is a top plan view thereof, the bicycle frame being shown partly folded in dot-dash lines.

FIG. 3 is a view looking from the line 3—3 of FIG. 1.

FIG. 4 is a view similar to FIG. 3 but showing the parts in open condition and in partly folded condition in dot-dash lines.

FIG. 5 is a side view looking from the line 5—5 of FIG. 1, on an enlarged scale.

FIG. 6 is a detail view of the parts of FIG. 5 in open condition.

FIG. 8 is a sectional view on an enlarged scale taken on line 8—8 of FIG. 7.

FIG. 9 is a cross-sectional view taken on the line 9—9 of FIG. 8.

Figures 7, 10:
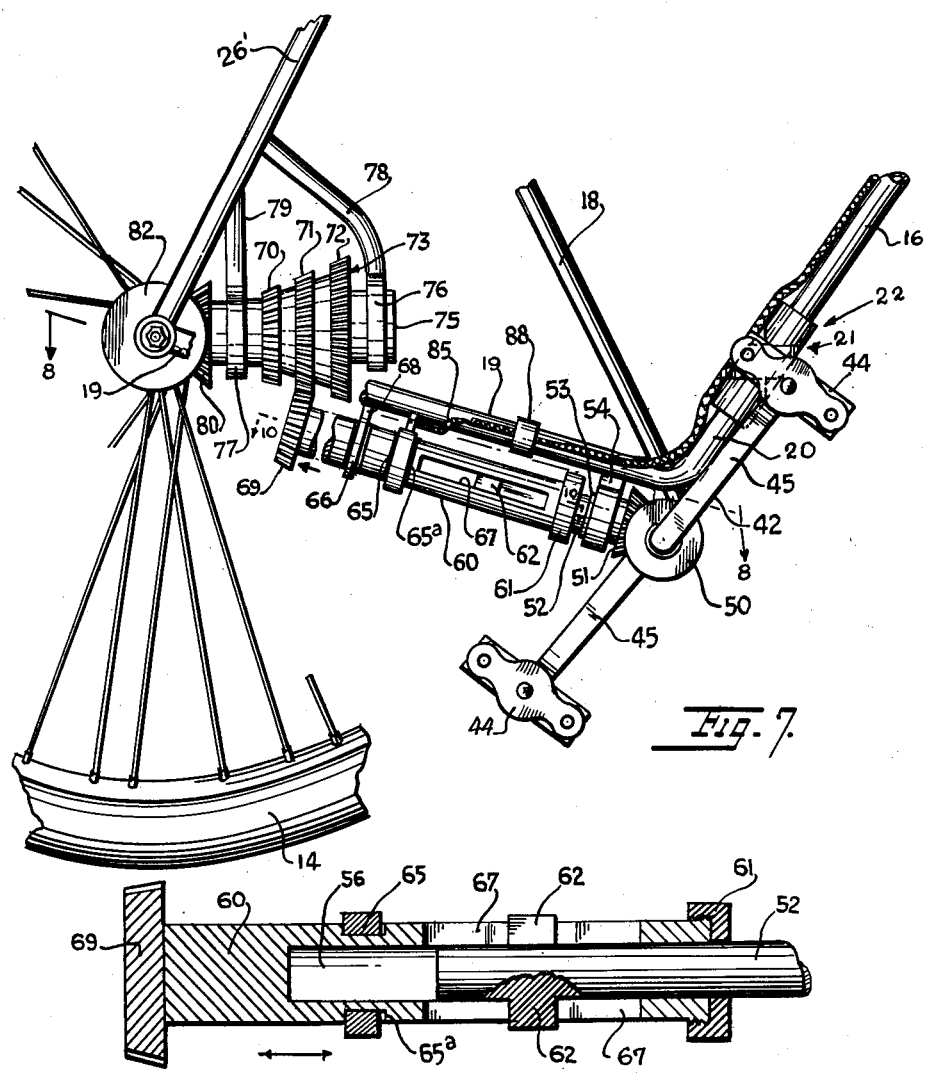
FIG. 7 is a side elevational view on an enlarged scale of the gear changing mechanism, parts being broken away.
FIG. 10 is an enlarged sectional view taken on the line 10—10 of FIG. 7, parts being shown broken away.

Referring to the drawings, in FIG. 1 there is shown a bicycle embodying the invention and designated generally by the reference numeral 10. The bicycle 10 has a foldable and sectional frame supported on front and rear wheels 11 and 12, respectively. The frame has a front section or unit 13 and a rear section or unit 14.

The front section includes a horizontal tubular bar 15 and a tubular bar 16 that slants downwardly and rearwardly.

The rear section 14 includes a downwardly and rearwardly extending tubular bar 17, a downwardly and forwardly extending tubular bar 18, and a horizontally disposed tubular bar 19 connecting the bottom ends of bars 17 and 18. The bars 17, 18 and 19 constitute a triangular shaped unit. A short tubular bar 20 extends upwardly and forwardly from the jointure between bars 18 and 19 and forms part of the rear section. A short horizontally disposed tubular bar 33 extends forwardly from the joinder of bars 17 and 18.

In accordance with the present invention, a pair of hinge assemblies 21 connect the ends of the front section 13 and the rear section 14 of the frame. Each hinge assembly 21 comprises a pair of hinge devices 22 and 23. Each hinge device includes a sleeve 24 from one side of which radiates an arm 25 and from the other side an arm 26. The free end of arm 25 of hinge device 22 terminates in a flat extension 27 narrower than the arm, and the free end of arm 25 of hinge device 23 is formed with a bifurcated end 28 adapted to receive the extension 27 therebetween. The extension and bifurcations are perforated to receive a hinge pin 29 whereby the hinge devices are hingedly fastened to each other. The arm 26 of hinge device 22 has a reduced free end formed with a threaded socket opening 30, and the arm 26 of hinge device 23 carries a bracket 31 with a set screw 32 on the free end thereof adapted to be received in the socket opening 30 of hinge device 22 whereby the hinge devices may be fastened together in juxtaposed position as shown in FIG. 3.

In joining the ends of the front and rear sections of the frame, hinge device 22 of one hinge assembly is mounted on the end of tubular bar 15 and hinge device 23 thereof is mounted on the adjacent end of tubular bar 23 as seen in FIGS. 1 and 3. A hinge device of the other hinge assembly is mounted on the end of tubular bar 16 and a hinge device 23 thereof on the adjacent end of tubular bar 20 as seen in FIGS. 1 and 5. The sleeves 24 of both assemblies are in abutting relation and the bracket 31 of arm 26 of hinge device 23 is swung over the socketed end of arm 26 of hinge device 22 and the set screw 32 threaded into position in the socket opening 20 thereof as seen in FIG. 3, thereby holding the sections in aligned position.

The bicycle 10 has a gear change mechanism best shown in FIGS. 7–10. The bicycle has a pedal crank 42 carrying pedals 44 at its ends. The crank has arms 45 rotatable in vertical planes parallel to the plane of the frame. The crank has a short horizontal shaft portion 46 journaled to rotate in bearings 48 formed at the forked end 43 of frame arm 20. Shaft portion 46 carries a bevel gear 50 which meshes with another bevel gear 51 carried at the end of a shaft 52. Shaft 52 is journaled to rotate in a bearing 53 carried at the lower end of a bearing bracket 54 depending from frame bar 19.

Shaft 52 is inserted in bore 56 of an axially slidable sleeve 60. The shaft has lateral keys or pins 62 disposed in longitudinal slots 67 formed in the sleeve so that the sleeve will rotate with the shaft. A flange ring 61 on one end of the sleeve holds the sleeve on the shaft. The sleeve is slidably and rotatably journaled in a bearing 66 carried by a bracket 68 depending from bar 19. The rear free end of the sleeve carries a spur gear 69 secured thereto. This gear meshes with any one of a plurality of conical gear sections 70, 71, 72 of a conical gear 73. Gear 73 has a shaft 75 journaled in bearings 76, 77 at the lower ends of brackets 78, 79 respectively, depending from forks 26' of frame bar 17. At the rear end of shaft 75 is a bevel gear 80 which meshes with another bevel gear 82 carried on a shaft 84 keyed to the hub 86 of wheel 14.

In operation of the gear shift mechanism, the rider can move the sleeve 60 axially so that any one of sections 70–72 will engage with gear 69 to change the speed of rotation of the wheel 12.

In order to move the sleeve 60 axially there is provided a ring 65 which is fitted in a circumferential slot 65ᵃ of the sleeve 60 so that the sleeve is free to rotate. The ring is engaged by a flexible core 85 of a flexible cable tube 86 held by a clamp ring 88 and 89 to frame bars 19 and 16. The cable terminates at handle bars 83. A handle 87 secured to the upper end of the core may be manually grasped for moving the cable core in the cable tube 86, and thus shifting the gears of the speed changing mechanism.

The structure described is rugged and simpler than those heretofore employed for gear changing mechanisms in bicycles.

One of the handle members 83' is pivoted at 83ᵃ, so that this handle member may be turned upwardly about 90°, when the bicycle is folded under the opposite handle member 83".

Any suitable locking means may be provided for keeping the bicycle in folded position, such as slide pin 23' in the hinge member 23 adapted to be engaged into a complementary opening 22' formed in the hinge member 22.

It is to be understood that the bicycle is equipped with the conventional ratchet device or with any other conventional mechanical escapement arrangement to permit free coasting of the bicycle wheels.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

In a foldable and collapsible bicycle, a sectional frame, including front and rear frame sections, wheels supporting the frame, said front frame section including a horizontal bar and a downwardly and rearwardly extending bar connected thereto, said rear frame section including a horizontal bar, a downwardly and rearwardly extending bar connected to the horizontal bar, and a horizontal bar connected to the bottom of the downwardly and rearwardly extending bar, and an upwardly and forwardly extending bar connected to said last-named horizontal bar, and hinge assemblies joining the ends of the horizontal bars of the front and rear frame sections and joining the upwardly and forwardly slanting bar of the rear section and the downwardly and rearwardly extending bar of the front section, each hinge assembly including sleeves around the adjacent ends of the connected bar, arms extending from one side of the sleeves and hingedly connected to each other at their outer ends, and arms extending from the opposite side of the sleeves, one of said latter arms carrying a latch with set screw, the other of said latter arms having a threaded socketed opening receiving the set screw, means provided in said hinge assembly for locking the bicycle in folded position, a pair of handle bars for steering the bicycle, one of said handle bars being hinged, to permit handle bar to be turned upwardly when the bicycle is in folded position, thereby to reduce the overall width of the said folded bicycle.

References Cited in the file of this patent

UNITED STATES PATENTS

| | | |
|---|---|---|
| 578,011 | Girardet | Mar. 2, 1897 |
| 1,150,087 | Williams | Aug. 17, 1915 |
| 1,635,296 | Doemming | July 12, 1927 |
| 2,359,764 | Johnson | Oct. 10, 1944 |
| 2,372,024 | Schwinn | Mar. 20, 1945 |
| 2,578,409 | Evans et al. | Dec. 11, 1951 |

FOREIGN PATENTS

| | | |
|---|---|---|
| 323,790 | France | Nov. 20, 1902 |
| 1,019,111 | France | Oct. 22, 1952 |
| 1,106,626 | Germany | May 10, 1961 |
| 20,926 | Great Britain | of 1909 |
| 650,494 | Great Britain | Feb. 28, 1951 |